United States Patent [19]

Sun

[11] Patent Number: 4,607,093

[45] Date of Patent: Aug. 19, 1986

[54] SYDNONE BASED POLYIMIDE

[75] Inventor: Kwok K. Sun, North Haven, Conn.

[73] Assignee: The Dow Chemical Company, Midland, Mich.

[21] Appl. No.: 720,778

[22] Filed: Apr. 8, 1985

[51] Int. Cl.[4] ............................................. C08G 73/10
[52] U.S. Cl. .................................... 528/322; 521/180; 521/183; 521/189; 528/170; 528/228; 528/321
[58] Field of Search ............... 528/322, 170, 228, 321; 521/180, 183, 189

[56] References Cited

U.S. PATENT DOCUMENTS 3,694,417  9/1972  Rigby et al. ......................... 528/322
3,897,393  7/1975  Lu ........................................ 528/322
3,998,787  12/1976  Bargain ............................... 528/322

OTHER PUBLICATIONS

Stille et al., J. of Polymer Science, Part A-1, vol. 6, 2331-2342 (1968).

*Primary Examiner*—Harold D. Anderson
*Attorney, Agent, or Firm*—James S. Rose

[57] ABSTRACT

Novel amorphous polyimides are provided which are formed by the polymerization of bismaleimides with sydnones wherein carbon dioxide is evolved.

The polyimides are readily soluble in dipolar aprotic solvents and are further characterized by high temperature stability to at least 300° C.

The polymers find particular utility in the form of films and solutions useful for wire enamel and electrical coatings.

20 Claims, No Drawings

SYDNONE BASED POLYIMIDE

FIELD OF THE INVENTION

This invention relates to the preparation of polyimide polymers, and, more particularly, is concerned with the preparation of a new class of polyimide polymers containing a 1,7-diazabicyclo[2.2.1]heptane ring system in the recurring unit.

DESCRIPTION OF THE PRIOR ART

The preparation of polymers from sydnone compounds has been reported in the prior art. Stille et al. [J. of Polymer Science: Part A-1, Vol. 6, 2331-2342 (1968)] have reported the preparation of polyprazoles and polypyrazolines via the polymerization reactions between disydnone compounds with such comonomer reactants as diethynlbenzene, divinylbenzene, and p-benzoquinone.

Rigby et al in U.S. Pat. No. 3,694,417 have disclosed the 1,3-dipolar addition of certain oxazol-5-ones to bis-dipolarophiles such as bismaleimides to form high temperature stable polymers. The recurring unit in these polymers contains a 7-azabicyclo[2.2.1]heptane ring system.

I have now discovered a new class of high temperature stable polyimides based on known sydnone compounds and bismaleimides.

SUMMARY OF THE INVENTION

This invention comprises polyimides having the recurring unit of formula (I) [see FORMULA CHART below] wherein R represents a divalent radical selected from the group consisting of alkylene, arylene, and cycloalkylene; $R^1$ is hydrocarbyl; $R^2$ is selected from the group consisting of hydrogen and hydrocarbyl; and $R^3$, $R^4$, $R^5$ and $R^6$ are independently selected from the group consisting of hydrogen, and lower alkyl of $C_1$ to $C_4$.

This invention also comprises a process [see REACTION CHART below] for the preparation of a polyimide having the recurring unit (I) said process comprising heating together in substantially equimolar proportions (A) a bismaleimide having the formula (II) with (B) a sydnone having the formula (III) at a temperature sufficiently high to eliminate carbon dioxide. The definitions of $R^1$ and $R^2$ in respect of (III) and R, $R^3$, $R^4$, $R^5$, and $R^6$ in respect of (II) have the same significance set forth above for the recurring unit (I).

The term "alkylene" means straight and branched chain alkylene having 1 to 8 carbon atoms, inclusive, such as methylene, ethylene, propylene, butylene, pentylene, hexylene, heptylene, octylene, and isomeric forms thereof.

The term "arylene" means arylene containing radicals having 6 to 18 carbon atoms, inclusive, such as phenylene, tolylene, naphthylene, diphenylylene, and divalent radicals having the formula

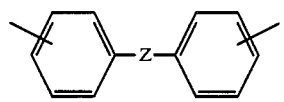

wherein Z is selected from the group consisting of —CO—, —O—, —SO$_2$—, and alkylene having 1 to 4 carbon atoms, inclusive.

The term "cycloalkylene" means cycloalkylene having 4 to 6 carbon atoms in the ring such as cyclobutylene, cyclopentylene, cyclohexylene, and the like.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, heptyl, octyl, and the like including isomeric forms thereof; alkenyl such as vinyl, allyl, butenyl, pentenyl, hexenyl, octenyl, and the like, including isomeric forms thereof; aralkyl such as benzyl, phenethyl, and the like; aryl such as phenyl, tolyl, xylyl, naphthyl, and the like; cycloalkyl such as cyclobutyl, cyclopentyl, cyclohexyl, and the like; cycloalkenyl such as cyclopentenyl, cyclohexenyl, and the like.

The hydrocarbyl groups can be substituted by one or a plurality of inert substituents. The term "inert substituent" means a substituent which is inert under the conditions of the polymerization process and does not otherwise interfere with said process or the resulting polyimide. Illustrative of such substituents are halo, i.e., chloro, bromo, fluoro, and iodo; nitro; alkoxy from 1 to 8 carbon atoms, inclusive, such as methoxy, ethoxy, propoxy, butoxy, pentyloxy, hexyloxy, heptyloxy, octyloxy, and the like, including isomeric forms thereof; and cyano.

The term "lower alkyl of $C_1$ to $C_4$" has the same definition set forth above under the definition of alkyl under hydrocarbyl except that the carbon atom upper limit is 4.

The formation of the recurring unit (I) which contains the 1,7-diazabicyclo[2.2.1]heptane ring system can theoretically be formed in three possible geometric isomer configurations. While not wishing the present invention to be limited by any theoretical considerations but only by the claims appended hereinbelow it is to be understood that the present invention and claims therefor contemplate the polyimides so formed in any of their geometric or spatial configurations. The actual formation of the 1,7-diazabicyclo[2.2.1]heptane ring system via the reaction of a maleimide with a sydnone has been substantiated by nuclear magnetic resonance studies using model compounds.

DETAILED DESCRIPTION OF THE INVENTION

The novel polyimides of the invention are prepared via the novel process set forth in the schematic equation shown below (see REACTION CHART). The bismaleimide (II) and sydnone (III) are brought together preferably under anhydrous conditions in substantially equimolar proportions and heated at a temperature sufficiently high to bring about a cycloaddition reaction with the elimination of carbon dioxide and the formation of the polyimide having the recurring unit (I).

The bismaleimide monomers are well-known and readily available compounds as typically disclosed in U.S. Pat. Nos. 2,444,536 and 3,694,417 cited supra whose disclosures relative thereto are incorporated herein by reference. Typically, they are provided when the appropriate diamine is reacted with maleic anhydride or the appropriately substituted maleic anhydride to provide the bismaleamic acid which is then cyclodehydrated to the bismaleimide using any appropriate dehydrating procedure.

A preferred group of bismaleimide monomers for use in the present process comprises those wherein $R^3$, $R^4$, $R^5$, and $R^6$ are all hydrogen. Preferred within this group are those monomers wherein R is arylene and alkylene, and most preferred are those wherein R is arylene.

Illustrative but not limiting of the monomers are N,N'-methylenebismaleimide, N,N'-ethylenebismaleimide, N,N'-1,3-propylenebismaleimide, N,N'-1,4-butylenebismaleimide, N,N'-1,5-pentylenebismaleimide, N,N'-1,6-hexylenebismaleimide, N,N'-1,7-heptylenebismaleimide, N,N'-1,8-octylenebismaleimide, N,N'-1,2-propylenebismaleimide, N,N'-isobutylenebismaleimide, N,N'-ethylenebis(methylmaleimide), N,N'-ethylenebis(dimethylmaleimide), N,N'-1,4-butylenebis(ethylmaleimide), N,N'-1,4-butylenebis(diethylmaleimide), N,N'-ethylenebis(dibutylmaleimide), and the like; 1,4-bis(maleimido)benzene, 1,3-bis(maleimido)benzene, 1,3-bis(maleimido)-4-methylbenzene, 1,3-bis(maleimido)-2-methylbenzene, 1,4-bis(maleimido)anisole, methylenebis(4-maleimidobenzene), methylenebis(3-maleimidobenzene), oxybis(4-maleimidobenzene), oxybis(3-maleimidobenzene), sulfonylbis(4-maleimidobenzene), ketobis(4-maleimidobenzene), methylenebis[4-(3,4-dimethylmaleimido)benzene], and the like; 1,3-bis(maleimido)cyclobutane, 1,3-bis(maleimido)cyclopentane, 1,3-bis(maleimido)cyclohexane, 1,4-bis(maleimido)cyclohexane, and the like.

A preferred group comprises 1,4-bis(maleimido)benzene, 1,3-bis(maleimido)benzene, 1,3-bis(maleimido)-4-methylbenzene, 1,3-bis(maleimido)-2-methylbenzene, methylenebis(4-maleimidobenzene), and oxybis(4-maleimidobenzene).

The sydnone monomers are also well-known and readily available compounds. They belong to a class of so-called meso-ionic compounds which cannot be adequately explained by any single valency structure. Accordingly, they are commonly written as in formula (III) below with the ring position numbers as shown. For the chemistry and preparations of such sydnone monomers see, inter alia, The Chemistry of Sydnones by F. H. C. Stewart, Chemical Reviews, 64, 129 (1964); J. of Polymer Science, cited supra, and Organic Synthesis (Vol. 45, 96, John Wiley, Inc. 1965). Principally, the appropriately substituted N-nitroso-α-amino acid is dehydrated to form the desired sydnones (III).

A preferred group of sydnone monomers for use in the present process comprises those wherein $R^1$ is aryl and $R^2$ is hydrogen or alkyl.

Illustrative but not limiting of the monomers (III) are 3-methylsydnone, 3-ethylsydnone, 3-propylsydnone, 3-butylsydnone, 3-amylsydnone, 3-hexylsydnone, 3-heptylsydnone, 3-octylsydnone, 3-allylsydnone, 3-benzylsydnone, 3-phenethylsydnone, 3-phenylsydnone, 3-tolylsydnone, 3-xylylsydnone, 3-cyclobutylsydnone, 3-cyclopentylsydnone, 3-cyclohexylsydnone, 3-phenyl-4-methylsydnone, 3-phenyl-4-ethylsydnone, 3-phenyl-4-butylsydnone, 3-phenyl-4-phenylsydnone, 3-phenyl-4-allylsydnone, 3-phenyl-4-benzylsydnone, 3-phenyl-4-cyclohexylsydnone, and the like.

A preferred group comprises 3-phenylsydnone, 3-tolylsydnone, 3-phenyl-4-methylsydnone, 3-phenyl-4-ethylsydnone, 3-phenyl-4-isopropylsydnone, and 3-phenyl-4-butylsydnone.

The proportions with which (II) and (III) are reacted together, as described above, are substantially equimolar. That is to say, when (II) and (III) are pure, then equimolar proportions provide for optimum molecular weights in the resulting polyimides in accordance with the principles of condensation polymerization reactions.

Generally speaking, the temperature to which the ingredients must be heated to eliminate carbon dioxide and form the polymers will vary considerably depending on the particular reactants involved, the presence or absence of solvent, and the like. Advantageously, the temperature falls within a range of about 75° C. to about 250° C., and, preferably, about 85° C. to about 180° C.

It is not essential that a solvent be employed, and, in fact, in the preparation of cellular polyimides (discussed below) a solvent is not desirable. However, in an optional and preferred embodiment for the preparation of non-cellular polyimides having optimum molecular weights, an inert organic solvent is employed. The term "inert organic solvent" means a solvent which does not react with the starting monomers, polymer products or otherwise interfere with the course of the polymerization. Illustrative of the solvents which can be employed are aromatic solvents such as benzene, toluene, xylene, nitrobenzene, chlorobenzene, dichlorobenzene, and the like; dipolar aprotic solvents such as dimethylformamide, dimethylacetamide, dimethyl sulfoxide, tetramethylene sulfone, hexamethylphosphoramide, N-methylpyrrolidone, tetramethyl urea, and the like; aliphatic esters such as ethyl acetate, butyl acetate, and the like; chlorinated aliphatic solvents such as carbon tetrachloride, trichloroethylene, tetrachloroethane, and the like; and aliphatic ether solvents such as glyme (dimethylether of ethylene glycol), diglyme (dimethylether of diethylene glycol), triglyme (dimethylether of triethylene glycol), and the like.

A preferred class of solvents comprises the dipolar aprotic solvents exemplified above.

The amount of solvent employed is not critical but should be at least sufficient to ensure that all the reactants are in solution. Advantageously, the amount is at least about 500 parts per 100 parts of maleimide and preferably is at least about 800 parts per 100 parts of maleimide. The upper limit on the amount of solvent employed is dictated purely by expediency and economic considerations.

The progress of the polymerization process and thus the time required for its completion is readily determined by conventional analytical procedures. Insofar as the polyimides remain in solution, which they do particularly when dipolar aprotic solvents are employed, an aliquot of the solution can be taken at intervals and examined by infrared spectroscopy, nuclear magnetic resonance, thin layer chromatography (TLC), and like methods. For example, the characteristic infrared absorption for the sydnone at $1760 \pm 10$ cm$^{-1}$, or its presence on a silica gel plate developed in toluene/ethyl acetate at 7/3 w/w, can be followed to its disappearance. Additionally, the vent from the polymerization flask can be connected to a micro-bubbler and the evolution of carbon dioxide thereby observed to its completion or the polymer solution viscosity can be monitored to its maximum level.

The actual time to complete any given reaction will depend on a number of factors such as the monomers, type of solvent, and actual temperature employed. While not wishing the scope of the present process to be limited by any particular polymerization time, generally speaking, the completion of gas evolution will fall within the range of about 2 hours to about 36 hours.

In general, the polyimide is soluble in the reaction solvent, particularly in the case of the preferred dipolar aprotic solvents. The polymer is readily isolated using conventional isolation procedures. Illustratively, the solvent can be removed using the standard distillation procedures, preferably in vacuo to provide the residual polymer. The solid can then be pulverized and used accordingly.

In a preferable isolation procedure the polymer solution is poured into a non-solvent causing the precipitation of the polyimide in the form of strands or rope. Typical non-solvents include water, methanol, ethanol, acetone, tetrahydrofuran, hexane, and the like. Water is a particularly preferred non-solvent medium.

The isolated polymer may, if desired, be further purified either before or after being pulverized by washing with acetone to remove residual impurities. Drying can be effected either under atmospheric, or subatmospheric pressure, or both in sequence.

In yet another embodiment of the present process, polyimides in accordance with the present invention can be provided as cellular foams. This is readily accomplished by heating the bismaleimide (II) and the sydnone (III) preferably in the absence of any solvent. Solvents, if desired, can be initially used to facilitate the mixing of the monomers but are removed prior to the heating step. However, solvent is not essential as the ingredients can be mixed in the solid state and preferably in pulverized form prior to heating.

Any of the monomer components and solvents recited above may be employed in the recited proportions to prepare the foamed polyimides. The heating of the thoroughly mixed components can be carried out within the temperature ranges specified above but preferably at temperatures greater than 100° C. until the evolution of carbon dioxide is completed. Generally speaking, the foaming process is completed within a 1 to 2 hour period.

The polyimide foam is obtained as a yellow colored, relatively even-celled, hard, and brittle foam with strong structural integrity.

Additives such as antioxidants, dyes, fire retardants, and the like may be added to solutions of the polymers of the present invention. Alternatively, the additives can be added to the dry powdered polymers either prior to, or during, processing steps such as molding, casting, extruding, and the like.

The polyimides of the present invention are amorphous polymers characterized by an inherent viscosity of at least 0.3 dl/g. as determined for a 0.5 percent by weight solution in DMF, NMP or m-cresol. In respect of forming strong films, it is preferred to employ those polyimides of the invention characterized by an inherent viscosity of at least 0.5 dl/g.

The polymers are readily soluble in the dipolar aprotic solvents such as N-methyl-pyrrolidone, dimethylformamide, dimethylacetamide, and tetramethylene sulfone, and m-cresol.

Differential scanning calorimetry shows the polyimides to be stable at least to 300° C. and decomposition does not begin before 350° C. in most cases.

The polyimides can be compression molded, cast from solution, made into films using standard film casting procedures, and the like.

Molded articles of the present polyimides find utility as bushings, seal faces, electric insulators, brake lining, clutch faces, and the like. In view of their ready solubility they also find utility as wire enamels, coatings, and the like wherein the solution of the polymer is painted on the wire or the article to be coated followed by solvent removal. The films so formed can be used in printed circuits, flexible circuitry, wrappings for rotors and cables, and the like.

The polyimide foams find utility in metal honeycomb structures requiring low weight to strength ratios along with high temperature stability. The foams can be prepared in situ within said structures to provide prefabricated siding for aircraft and the like.

The following examples describe the manner and process of making and using the invention and set forth the best mode contemplated by the inventor of carrying out the invention but are not to be construed as limiting.

EXAMPLE 1

A 50 ml. reaction flask equipped with a stirrer, reflux condenser, thermometer, and gas inlet tube was flushed with nitrogen. The flask was charged with 0.2552 g. (0.001573 mole) of 3-phenylsydnone, 0.5639 g. (0.001573 mole) of methylenebis(4-maleimidobenzene), and 8 ml. of tetramethylene sulfone.

The resulting light orange colored solution was heated during stirring in an oil-bath set at 95° C. As the solution was warming up and approaching 95° C., a slow steady evolution of carbon dioxide was observed in a micro-bubbler. After a 20 hour reaction period at 95° C. the carbon dioxide evolution had stopped and the solution was very viscous. The bath temperature was increased to 115° C. in 1 hour and kept at this temperature for 3 hours. The resulting solution was light brown and its viscosity had increased.

The solution was slowly poured into 2 liters of cold water whereupon the polymer product solidified in the water as a continuous light yellow string. This solid was separated from the precipitating bath, washed thoroughly by stirring with fresh water and then stirred thoroughly with 200 ml. of acetone for 3 hours. It was left immersed overnight in 200 ml. of fresh acetone. Finally it was dried at 70° C. under atmospheric pressure followed by 130° C. under 0.1 mm. of mercury pressure for 4 hours. The polymer was ground to a lightcream colored powder. Thus there was obtained 0.73 g. of a polyimide in accordance with the invention having the following recurring unit.

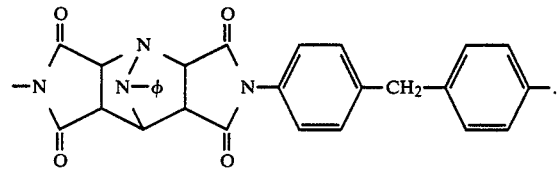

The polyimide had an inherent viscosity $\eta_{inh}$ of 0.83 dl/g. in m-cresol (0.5% at 30° C.). It had no apparent $T_g$ by differential scanning calorimetry (DSC) but upon heating started to change color at 320° C. and decomposed at about 350° C. to a dark brown solid.

EXAMPLE 2

Using the same apparatus and procedure described in Example 1, the reaction flask was charged with 0.3281 g. (0.00202 mole) of 3-phenylsydnone, 0.7291 g. (0.00202 mole) of oxybis(4-maleimidobenzene), and 9 ml. of tetramethylene sulfone. The reaction temperatures and times were identical to those set forth in Example 1. The yellow colored reaction solution did not deepen with time nor with the increased reaction temperature of 115° C. as the carbon dioxide was evolving.

The polymer product was isolated and treated as previously described in Example 1. Thus, there was obtained 0.91 g. of a white solid polyimide in accordance with the invention having the following recurring unit

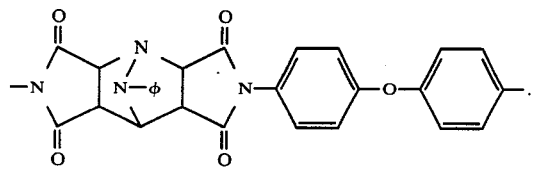

The polyimide had an inherent viscosity (average of four determinations) $\eta_{inh}$ of 0.81 dl/g. in N-methylpyrrolidone (0.5% at 30° C.). DSC temperature scans showed no apparent $T_g$ and at 320° C. the white sample turned light yellow followed by decomposition at about 350° to 360° C. The polymer was readily soluble in N-methylpyrrolidone, dimethylformamide, dimethylacetamide, and tetramethylene sulfone.

The preparation of the polyimide was repeated on a slightly larger scale using 1.6215 g. (0.010 mole) of 3-phenylsydnone with 3.6754 g. (0.010 mole) of the oxybis(4-maleimidobenzene) and 45 ml. of tetramethylene sulfone. The same procedure as above was used except for the heating period which was 95° C. for 24 hours. The polyimide obtained had an inherent viscosity $\eta_{inh}$ of 0.81 dl/g. in N-methylpyrrolidone (0.5% at 30° C.) [value determined 2 hours after polymer was dissolved in the N-methylpyrrolidone].

A strong flexible and transparent film was prepared by first dissolving the solid polyimide in DMF, at room temperature (68° C.), to form a clear solution of about 10-15% polymer content. This solution was cast onto a clean glass plate using a draw-knife set at 20 mils. The plate was then placed in an oven at 110°-120° C. for 2 hrs. The "dry" film was stripped from the plate and placed in a hydraulic press between sheets of fiberglass cloth. The platens were kept about ½" apart as they were heated to 200° C. and held there for 4 hrs. The film was then removed and cooled back to about 68° C.

EXAMPLE 3

Using the apparatus and procedure described in Example 1, the reaction flask was charged with 0.5285 g. (0.003 mole) of 3-phenyl-4-methylsydnone, 1.0751 g. (0.003 mole) of methylenebis(4-maleimidobenzene) and 25 ml. of tetramethylene sulfone.

During stirring the reaction solution was heated at 90° C. for 4 hours followed by 95° C. for 2 hours. Carbon dioxide was evolved during both periods. The viscous polymer solution was poured slowly into about 4 liters of cold water causing the polymer product to solidify in the water as a continuous string. The light cream colored polymer was washed with slowly running water for about 1 hour. This was followed by washing in acetone twice and being left immersed overnight in acetone. After decanting the acetone the polymer was washed again with fresh acetone. The polymer was dried first at 70° C. for 2 hours and then at 140° C. under 0.1 mm. of mercury pressure for 4 hours. The polymer was ground to a pale yellow powder. Thus, there was obtained 1.37 g. of a polyimide in accordance with the invention having the following recurring unit

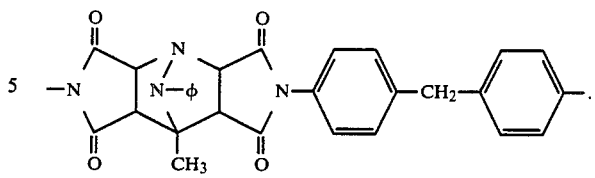

The polyimide had an inherent viscosity $\eta_{inh}$ of 0.40 dl/g. in m-cresol (0.5% at 30° C.).

EXAMPLE 4

Using the same apparatus and procedure described in Example 1, the reaction flask was charged with 0.3274 g. (0.00202 mole) of 3-phenylsydnone, 0.4442 g. (0.00202 mole) of N,N'-ethylenebismaleimide, and 8 ml. of tetramethylene sulfone.

The reaction solution was treated identically as in Example 1 by being heated for 20 hours first at 95° C. followed by about 4 hours at 115° C. During this time the evolution of carbon dioxide was observed with a micro-bubbler.

When the viscous solution was poured into the 2 liters of water the product precipitated as an off-white powder. It was washed with water and acetone according to the procedure of Example 1. Drying of the polymer was accomplished at 165° C. under 0.1 mm. of mercury pressure for 6 hours. Thus, there was obtained 0.67 g. of an off-white powdered polyimide in accordance with the present invention having the following recurring unit

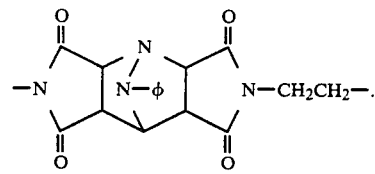

The polyimide had an inherent viscosity $\eta_{inh}$ of 0.25 dl/g. in m-cresol (0.5% at 30° C.). The DSC scan showed a melting and apparent decomposition at 340° to 350° C.

EXAMPLE 5

A polyimide cellular foam in accordance with the present invention and having the recurring unit set forth in Example 1 was prepared using the following procedure.

A 0.201 g. (0.0012 mole) sample of 3-phenylsydnone along with a 0.3584 g. (0.001 mole) sample of methylenebis(4-maleimidobenzene) were dissolved in 5 ml. of methylene dichloride at room temperature (about 20° C.). The solution was stirred for about 5 minutes also at room temperature.

The solvent was then removed by heating the solution at 50° C. in a rotary evaporator under about 25 mm. pressure of mercury. The residue was heated in an oven at 100° C. for 10 hours. No change could be observed (i.e. no carbon dioxide evolution). Further, heating at 120° C. for 1.5 hours resulted in the evolution of carbon dioxide, and, after cooling, the resultant formation of an even-celled yellow foam which was hard and brittle.

FORMULA CHART

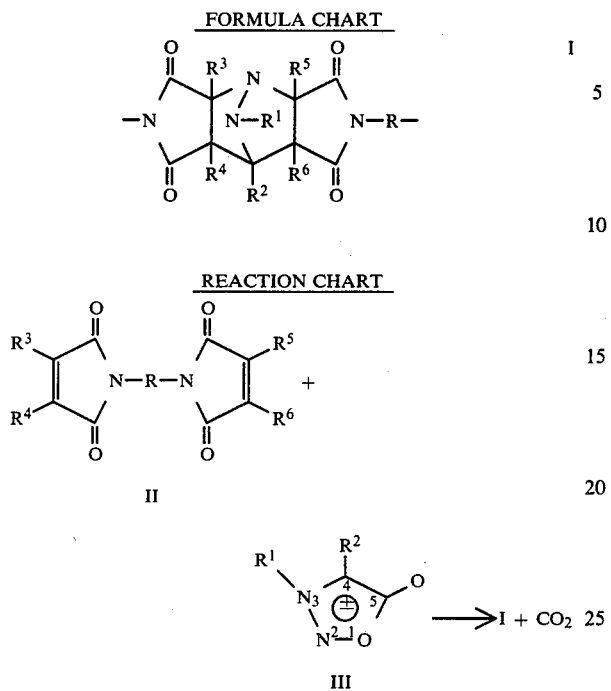

I

REACTION CHART

II

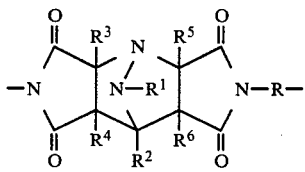 → I + CO₂

III

I claim:

1. A polyimide having the recurring unit

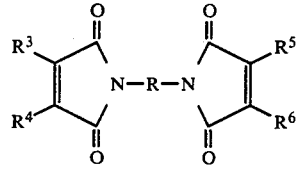

wherein R represents a divalent radical selected from the group consisting of alkylene, arylene containing radical, and cycloalkylene; $R^1$ is hydrocarbyl; $R^2$ is selected from the group consisting of hydrogen and hydrocarbyl; and $R^3$, $R^4$, $R^5$, and $R^6$ are independently selected from the group consisting of hydrogen, and lower alkyl of $C_1$ to $C_4$.

2. A polyimide according to claim 1 wherein $R^1$ is aryl, $R^2$ is hydrogen or alkyl, and $R^3$, $R^4$, $R^5$, and $R^6$ are all hydrogen.

3. A polyimide according to claim 2 wherein R is alkylene.

4. A polyimide according to claim 2 wherein R is arylene.

5. A polyimide according to claim 1 wherein R is 4,4'-methylenebisphenylene, $R^1$ is phenyl, and $R^2$, $R^3$, $R^4$, $R^5$, and $R^6$ are all hydrogen.

6. A polyimide according to claim 1 wherein R is 4,4'-oxybisphenylene, $R^1$ is phenyl, and $R^2$, $R^3$, $R^4$, $R^5$, and $R^6$ are all hydrogen.

7. A polyimide according to claim 1 wherein R is 4,4'-methylenebisphenylene, $R^1$ is phenyl, $R^2$ is methyl, and $R^3$, $R^4$, $R^5$, and $R^6$ are all hydrogen.

8. A polyimide according to claim 1 wherein R is 1,2-ethylene, $R^1$ is phenyl, and $R^2$, $R^3$, $R^4$, $R^5$ and $R^6$ are all hydrogen.

9. A polyimide according to claim 1 in the form of a cellular foam.

10. A process for the preparation of a polyimide in accordance with claim 1 said process comprising heating together in substantially equimolar proportions A. a bismaleimide having the formula

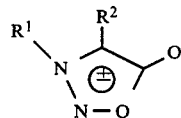

wherein R represents a divalent radical selected from the group consisting of alkylene, arylene containing radical, and cycloalkylene; $R^3$, $R^4$, $R^5$ and $R^6$ are independently selected from the group consisting of hydrogen, and lower alkyl of $C_1$ to $C_4$; and B. a sydnone having the formula

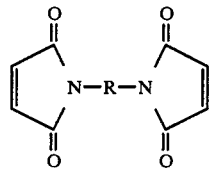

wherein $R^1$ is hydrocarbyl and $R^2$ is selected from the group consisting of hydrogen and hydrocarbyl at a temperature sufficiently high to eliminate carbon dioxide.

11. A process according to claim 10 wherein said (A) and said (B) are heated together in an inert solvent.

12. A process according to claim 11 wherein said solvent is a dipolar aprotic solvent.

13. A process according to claim 10 wherein said heating is carried out at a temperature of from about 75° C. to about 250° C.

14. A process according to claim 10 wherein

A. a bismaleimide having the formula

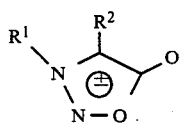

wherein R represents a divalent radical selected from the group consisting of alkylene, arylene containing radical, and cycloalkylene is heated together in substantially equimolar proportions with B. a sydnone having the formula

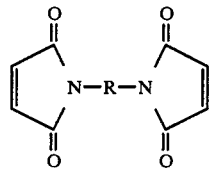

wherein $R^1$ is aryl and $R^2$ is hydrogen or alkyl in an inert solvent at a temperature of from about 75° C. to about 250° C. to eliminate carbon dioxide.

15. A process according to claim 14 wherein said solvent is tetramethylene sulfone and the temperature range is from about 90° C. to about 150° C.

16. A process according to claim 15 wherein (A) is methylenebis(4-maleimidobenzene) and (B) is 3-phenylsydnone.

17. A process according to claim 15 wherein (A) is oxybis(4-maleimidobenzene) and (B) is 3-phenylsydnone.

18. A process according to claim 15 wherein (A) is methylenebis(4-maleimidobenzene) and (B) is 3-phenyl-4-methylsydnone.

19. A process according to claim 15 wherein (A) is N,N'-ethylenebismaleimide and (B) is 3-phenylsydnone.

20. A process in accordance with claim 10 for the preparation of said polyimide in the form of a cellular foam said process comprising heating said reactants (A) and (B) in the absence of solvent and at a temperature sufficiently high to eliminate carbon dioxide.

* * * * *